United States Patent
Lidgi et al.

(10) Patent No.: US 12,170,682 B1
(45) Date of Patent: Dec. 17, 2024

(54) APPLICATION ENDPOINT CYBERSECURITY TECHNIQUES

(71) Applicant: Wiz, Inc., New York, NY (US)

(72) Inventors: Matilda Lidgi, Tel Aviv (IL); Danielle Aminov, Tel Aviv (IL); Eliran Marom, Yehud-Monoson (IL); Ron David Ben Arzi, Tel Aviv (IL); Rotem Lipowitch, Tel Aviv (IL); Amitai Cohen, Kfar Saba (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/425,847

(22) Filed: Jan. 29, 2024

(51) Int. Cl.
*H04L 9/40* (2022.01)

(52) U.S. Cl.
CPC ...... *H04L 63/1425* (2013.01); *H04L 63/1433* (2013.01); *H04L 63/20* (2013.01)

(58) Field of Classification Search
CPC . H04L 63/1425; H04L 63/1433; H04L 63/20; H04L 63/1441; G06F 21/552; G06F 21/577
See application file for complete search history.

(56) References Cited

U.S. PATENT DOCUMENTS

| | | | |
|---|---|---|---|
| 10,489,588 | B2 | 11/2019 | Ladnai et al. |
| 10,917,439 | B2 | 2/2021 | Puratheppparambil et al. |
| 11,005,860 | B1 | 5/2021 | Glyer et al. |
| 2018/0227324 | A1* | 8/2018 | Chambers ........... H04W 12/128 |
| 2018/0359272 | A1 | 12/2018 | Mizrachi et al. |
| 2021/0111944 | A1* | 4/2021 | Kuwabara ............... H04L 45/02 |
| 2021/0111958 | A1* | 4/2021 | Mahadevan ........... H04L 41/12 |
| 2021/0194782 | A1* | 6/2021 | Jump ...................... H04L 41/12 |
| 2021/0226869 | A1* | 7/2021 | Bhat ....................... H04L 43/20 |
| 2021/0234889 | A1* | 7/2021 | Burle .................. H04L 63/1433 |
| 2022/0198010 | A1* | 6/2022 | Ladnai ................. H04L 63/145 |
| 2023/0336581 | A1* | 10/2023 | Dunn ..................... G06F 21/577 |
| 2023/0351456 | A1 | 11/2023 | Hogg et al. |
| 2024/0098100 | A1* | 3/2024 | Lal ...................... H04L 63/1441 |
| 2024/0223592 | A1* | 7/2024 | Bazalgette .......... H04L 63/1433 |

OTHER PUBLICATIONS

Sun et al., "Move Smart Contract Vulnerability Detection based on Resource-flow Analysis."*
Chen et al., "Static detection of asymptotic resource side-channel vulnerabilities in web applications," 2017 32nd IEEE/ACM International Conference on Automated Software Engineering (ASE) Year: 2017 | Conference Paper | Publisher: IEEE.*

* cited by examiner

*Primary Examiner* — Roderick Tolentino
(74) *Attorney, Agent, or Firm* — M&B IP Analysts, LLC

(57) ABSTRACT

A system and method for application endpoint validation and securement is presented. The method includes: detecting an application endpoint on a resource deployed in a computing environment; generating in a security database: a representation of the application endpoint, and a representation of the resource, wherein the security database includes a representation of the computing environment; determining a network path between the resource and an external network, the network path including the application endpoint and a reachability parameter; initiating active inspection of the application endpoint over the network path; and initiating a mitigation action in the computing environment in response to determining through active inspection that the application endpoint is exposed to the external network.

19 Claims, 10 Drawing Sheets https://28305b9c65586300-dot-us-central1.notebooks.googleusercontent.com:443

Application Endpoint

- Configuration
  - Network    [ Properties ] ⟵ 260
  - Identity
  - Secrets
  - Kubernetes
- Application
- Data Name: 28305b9c65586300-dot-us-central1...    External ID: https://28305b9c65586300-dot...
Subscription: dev-project ami-test2-277908    Cloud Platform: Google Cloud Platform
Project: 6 projects    Port: 443
Host: 28305b9c65586300-dot-us-central1...    Port Start: 443
Port End 443    Protocols: HTTPS Dynamic Scanner Insights Severity  
[ Medium ]  ⟵ 270

The server responded with a 2XX status code (indicating that the request was received and accepted). Single sign-on (SSO) was detected, and your policy is permissive (authentication requirements and non2XX status codes are considered much lower risk).

Port Status: Open    HTTP Status: 200 OK
Web Page Title: Sign in – Google Accounts    HTTP Content Type: text/html; charset=utf-8
Authentication Method: SSO    Authentication Service Provider: Google
HTTP Status Code: 200 View Response Body

FIGURE 2B

APPLICATION ENDPOINT CYBERSECURITY TECHNIQUES

TECHNICAL FIELD

The present disclosure relates generally to cybersecurity, and specifically to application endpoint security.

BACKGROUND

Application endpoints are specific URLs or URIs (Uniform Resource Identifiers) within a software application that serve as entry points for interacting with the application's functionalities. These endpoints define the various operations or actions that can be performed, typically following the principles of Representational State Transfer (REST) or other web service architectures.

Each endpoint corresponds to a specific resource or functionality within the application. For example, in a web-based application, endpoints may include actions like retrieving user information, submitting a form, or accessing a specific data resource. Endpoints are crucial for enabling communication between different components of an application or between applications themselves.

Endpoints are often associated with HTTP methods, such as GET for retrieving data, POST for creating new resources, PUT or PATCH for updating existing resources, and DELETE for removing resources. Developers use these endpoints to build the application's functionality and expose them to clients like web browsers or mobile applications through APIs (Application Programming Interfaces).

Application endpoints pose cybersecurity risks due to potential vulnerabilities that attackers can exploit. Poorly secured or improperly configured endpoints may be susceptible to various threats, such as injection attacks, unauthorized access, or denial-of-service. Inadequate input validation and authentication mechanisms can lead to data breaches or unauthorized actions.

Additionally, if endpoints expose sensitive information without proper encryption, it increases the risk of eavesdropping and data interception. Regular security assessments and robust implementation of authentication, authorization, and encryption mechanisms are essential to mitigate these risks and ensure the overall cybersecurity of an application, however these utilize considerable computing resources.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting an application endpoint on a resource deployed in a computing environment. Method may also include generating in a security database: a representation of the application endpoint, and a representation of the resource, where the security database includes a representation of the computing environment. Method may furthermore include determining a network path between the resource and an external network, the network path including the application endpoint and a reachability parameter. Method may in addition include initiating active inspection of the application endpoint over the network path. Method may moreover include initiating a mitigation action in the computing environment in response to determining through active inspection that the application endpoint is exposed to the external network. Other embodiments of this aspect include corresponding computer systems, apparatus, and computer programs recorded on one or more computer storage devices, each configured to perform the actions of the methods.

Implementations may include one or more of the following features. Method may include: applying a policy to the representation of the computing environment, where the policy includes a rule applied to a representation of the application endpoint. Method may include: generating a value in the representation of the application endpoint based on a result of applying the rule to the representation of the application endpoint. Method may include: initiating the mitigation action further in response to determining that the representation of the application endpoint violates the rule. Method may include: applying the policy to a portion of the representation of the computing environment. Method may include: applying the policy to the portion of the representation, where each representation in the portion of the representation includes a tag having a predetermined value. Method may include: selecting the policy from a plurality of policies, each policy corresponding to a different level of severity. Method may include: inspecting the resource for a cybersecurity object, in response to determining that the representation of the application endpoint violates the rule. Method may include: determining that the resource includes a cybersecurity risk, based on detecting the cybersecurity object. Implementations of the described techniques may include hardware, a method or process, or a computer tangible medium.

In one general aspect, non-transitory computer-readable medium may include one or more instructions that, when executed by one or more processors of a device, cause the device to: detect an application endpoint on a resource deployed in a computing environment; generate in a security database: a representation of the application endpoint, and a representation of the resource, where the security database includes a representation of the computing environment; determine a network path between the resource and an external network, the network path including the application endpoint and a reachability parameter; initiate active inspection of the application endpoint over the network path; and initiate a mitigation action in the computing environment in response to determining through active inspection that the application endpoint is exposed to the external network. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect an application endpoint on a resource deployed in a computing environment. System may in addition include generate in a security database: a representation of the application endpoint, and a representation of the resource, where the security database includes a representation of the computing environment. System may also determine a network path between the resource and an external network, the network path including the application endpoint and a reachability parameter. System may furthermore initiate active inspection of the application endpoint over the network path. System may in addition initiate a mitigation action in the computing environment in response to determining through active inspection that the application endpoint is exposed to the external network. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: apply a policy to the representation of the computing environment, where the policy includes a rule applied to a representation of the application endpoint. System where the memory contains further instructions which when executed by the processing circuitry further configure the system to: generate a value in the representation of the application endpoint based on a result of applying the rule to the representation of the application endpoint. System where the memory contains further instructions which when executed by the processing circuitry further configure the system to: initiate the mitigation action further in response to determining that the representation of the application endpoint violates the rule. System where the memory contains further instructions which when executed by the processing circuitry further configure the system to: apply the policy to a portion of the representation of the computing environment. System where the memory contains further instructions which when executed by the processing circuitry further configure the system to: apply the policy to the portion of the representation, where each representation in the portion of the representation includes a tag having a predetermined value. System where the memory contains further instructions which when executed by the processing circuitry further configure the system to: select the policy from a plurality of policies, each policy corresponding to a different level of severity. System where the memory contains further instructions which when executed by the processing circuitry further configure the system to: inspect the resource for a cybersecurity object, in response to determining that the representation of the application endpoint violates the rule. System where the memory contains further instructions which when executed by the processing circuitry further configure the system to: determine that the resource includes a cybersecurity risk, based on detecting the cybersecurity object. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2B is an example illustration of a graphical user interface (GUI) of a representation of an application endpoint, utilized to describe an embodiment.

DETAILED DESCRIPTION

Figure 1:
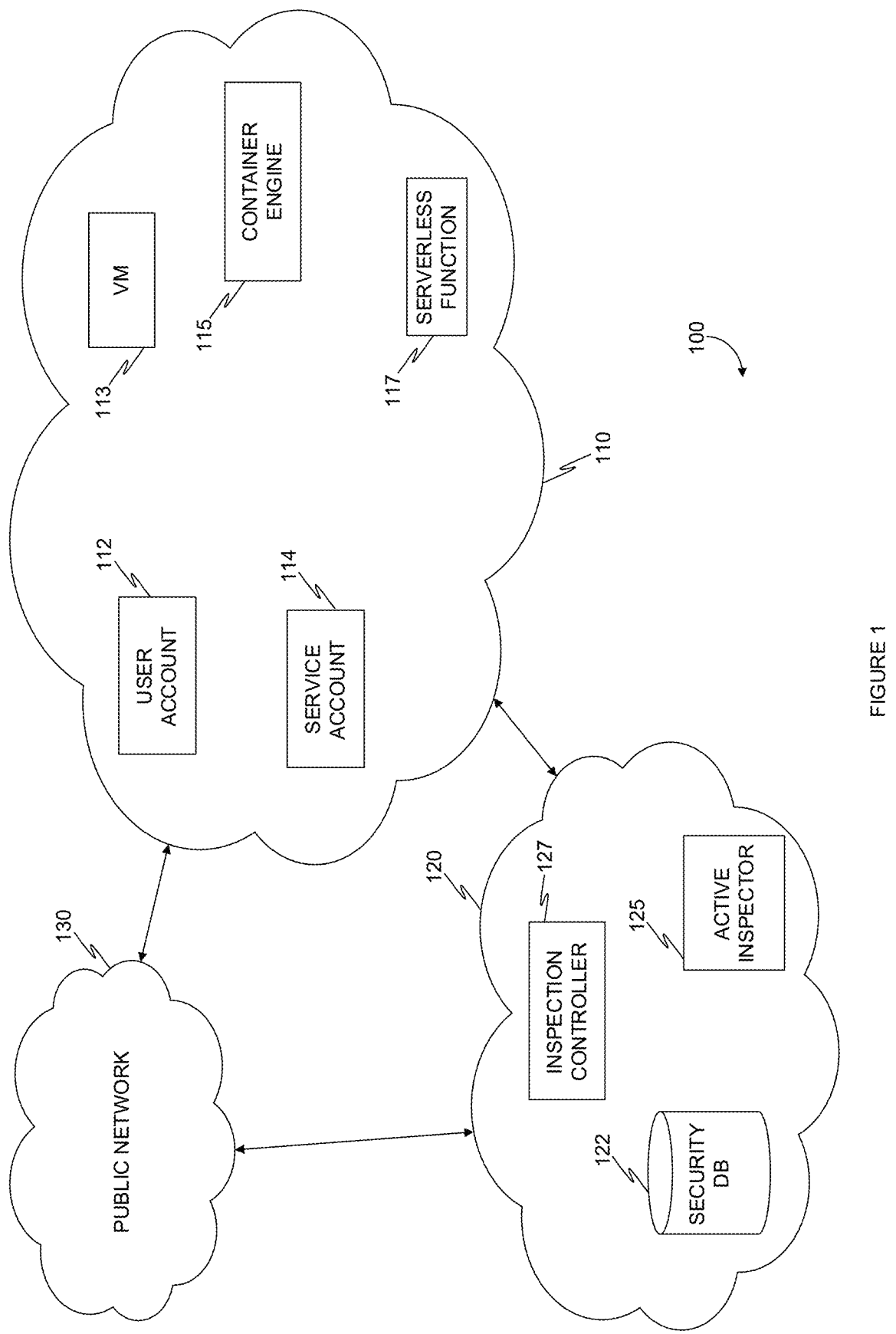
FIG. 1 is an example diagram of a cloud computing environment monitored by an active inspector, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram 100 of a cloud computing environment monitored by an active inspector, implemented in accordance with an embodiment. According to an embodiment, a first cloud computing environment 110 includes a plurality of principals and resources. In an embodiment, a resource is a cloud entity which exposes functionality, such as processing power, memory, storage, communication, and the like. In an embodiment, a resource is configured to expose a plurality of functionalities.

A resource is, according to an embodiment, a virtual machine (VMs) such as VM 113, a software container platform, such as container engine 115, a serverless function such as serverless function 117, and the like. A VM 113 may be implemented using Oracle® VirtualBox. A container engine 115 may be implemented using Kubernetes® or Docker®. A serverless function 117 may be implemented using Lambda®.

In an embodiment, a principal is a cloud entity which acts on a resource, meaning it can request, or otherwise initiate, actions, operations, and the like in the computing environment 110 which cause a resource to perform a function.

In some embodiments, a principal is, for example, a user account such as user account 112, a service account such as service account 114, a role, a user group, a local account, a network account, and the like. In an embodiment, a user account 112 is implemented as a data structure which includes information about an identity, such as a username, a password hash, an associated role, an associated user group, a combination thereof, and the like.

In certain embodiments, the first cloud computing environment 110 is implemented utilizing a cloud computing infrastructure, such as Amazon® Web Services (AWS), Microsoft® Azure, Google® Cloud Platform (GCP), and the like. In an embodiment, the first cloud computing environment 110 includes a virtual private cloud (VPC), a virtual network (VNet), a virtual private network (VPN), a combination thereof, and the like.

In an embodiment, the first cloud computing environment 110 is, for example, a production environment of an organization. A production environment is a computing environment which provides services, for example, to client devices within the production environment and outside of it. An organization may also have a staging environment, which is a computing environment substantially identical to the production environment in at least some deployments of resource (e.g., workloads, virtual instances, etc.) which is utilized for the purpose of testing new policies, new permissions, new applications, new appliances, new resources, and the like, which are not present in the production environment.

It is often of upmost importance to an organization to keep the production environment in a fully operational state. Therefore, using an active scanner to test accessibility to the first cloud computing environment 110 may be detrimental to this objective, since it would require devotion of substantial resources at least in terms of network bandwidth to perform such tests.

In an embodiment, an inspection environment 120 is communicatively connected with the first cloud environment 110, and a public network 130. According to an embodiment, the public network 130 is also communicatively connected with the first cloud computing environment 110. In an embodiment, the public network 130 includes, a wireless, cellular or wired network, a local area network (LAN), a wide area network (WAN), a metro area network (MAN), the Internet, the worldwide web (WWW), similar networks, and any combination thereof.

According to an embodiment, the inspection environment 120 is implemented as a VPC in a cloud computing infrastructure. In an embodiment, the cloud computing infrastructure of the inspection environment 120 is the same cloud computing infrastructure as the first cloud computing environment 110.

In some embodiments, the inspection environment 120 is implemented as multiple cloud environments, each utilizing a different cloud infrastructure. In an embodiment, the inspection environment 120 includes a security database (DB) 122 for storing a representation of the computing environment 110, an active inspector 125, and an inspection controller 127.

In an embodiment, the representation stored in the security DB 122 includes a representation of the first cloud computing environment 110 using a predefined data schema. In some embodiments, the security DB 122 is implemented as a graph database, such as Neo4J®.

For example, each resource and each principal of the first cloud environment 110 is represented as a corresponding resource node or principal node in a security graph, according to an embodiment. The various nodes in the security graph are connected, for example, based on policies, roles, permissions, and the like, which are detected in the first cloud computing environment 110, in an embodiment.

In some embodiments, a predefined data schema includes data structures into which values are inputted to represent a specific cloud entity. For example, a resource is represented, according to an embodiment, by a template data structure which includes data attributes, whose values uniquely identify the resource, such as address, name, type, OS version, and the like.

In an embodiment, an inspection controller 127 is configured to select resources, and the like, from the first cloud computing environment 110, and initiate inspection for the selected resources. According to an embodiment, initiating inspection includes provisioning an inspector (not shown) to inspect a resource, a copy of a resource, a clone of a resource, a snapshot of a resource, and the like, for a cybersecurity object.

In some embodiments, a cybersecurity object, a plurality of cybersecurity objects (e.g., a toxic combination), and the like, indicate a cybersecurity threat, a cybersecurity risk, a misconfiguration, an exposure, a vulnerability, a combination thereof, and the like.

In an embodiment, a cybersecurity object is a password, a certificate, a cryptographic key, a software library, a software binary, a software application, an operating system, a file, a folder, a code object, a hash value, a malware object, a combination thereof, and the like.

In certain embodiments, the inspection controller 127 is further configured to perform network discovery of the first cloud computing environment 110, for example to discover new resources deployed therein, detect network paths, detect network objects, a combination thereof, and the like.

In an embodiment, an active inspector 125 is configured to receive a network path to access a resource in the first cloud computing environment 110. In an embodiment, a network path is stored as a data string which includes one or more reachability parameters. Such parameters include host names, protocols, IP addresses, ports, usernames, passwords, and the like. In certain embodiments, the active inspector 125 is further configured to receive a list of network paths. The network paths are received periodically, according to an embodiment.

In certain embodiments, the active inspector 125 is further configured to generate an instruction which includes a query for the security DB 122, such instruction (or instructions) when executed by the security database 122 cause(s) generation of an output including one or more network paths. For example, network paths are generated every 24 hours, while active inspection occurs once per day, once per week, once per month, and so on, according to some embodiments.

In some embodiments, for example as described in more detail below with respect to FIG. 7, an active inspector 125 is configured to access a first resource in a cloud environment, determine, or otherwise receive, a second network path to at least one second resource, and actively inspect the second network path to determine if each at least one second resource can be accessed from the first resource. This is advantageous, for example, to determine reachability to second resources, such as a web server (second resource) which is accessed through a load balancer (first resource) Thus, it is possible for an attacker to gain access through a first network path (i.e., from an external network) to a first resource, then gain access through a second network path (i.e., internal network path between the first resource and a second resource) to the second resource.

For example, the first network path may indicate a hostname, such as example.com, while the second network path indicates an application path. For example, the first network path may be "example.com:220" and the second network path may be "\webserver\".

In some embodiments, the second network path may be determined based on a detected application in the security graph. For example, the security graph may be traversed to determine what application nodes (i.e., nodes representing an application) are connected to a resource node (e.g., a node representing a virtual machine). Based on the type of application node, a second network path may be generated which corresponds to the application represented by the application node. For example, it may be predetermined that a MySQL engine listens for commands at "\mysql\input\". Therefore, if an application node representing a MySQL application is detected by traversing the graph, a first network path may be generated based on a machine which hosts the application, and a second network path may be generated based on a predetermined path (e.g., \mysql\input\).

In an embodiment, the active inspector 125 is configured to generate an instruction based on the network path to access the resource associated with the network path. For example, the instruction may be to send a data packet to an IP address of the resource and receive an acknowledgement (ACK) response, according to an embodiment.

In certain embodiments, the active inspector 125 is configured to generate a log which includes, for example, the network path, the instruction sent by the active inspector 125, and any response(s) received from the resource. For example, in an embodiment where the active inspector 125 is configured to send an HTTP (hypertext transfer protocol) request, a response may be a 404 error, a 403 error, 500 error, 502 error, and the like.

In an embodiment, the active inspector 125 initiates active inspection of a network path to determine if a resource is accessible via the network path from a network which is external to the first cloud environment 110, such as the public network 130.

In some embodiments, the inspection controller 127 is configured to detect an application endpoint on a resource. For example, according to an embodiment, an application endpoint is an interface through which a resource is accessible from a network which is external to the first cloud computing environment 110.

In an embodiment, detecting an endpoint is performed utilizing static analysis techniques. In some embodiments, an application endpoint is detected by inspecting a resource for a hosted technology (e.g., an installed software application), detecting a software library, a software binary, an application path, and the like, associated with the hosted technology, and determining that the hosted technology is configured to typically communicate through a predetermined port (e.g., port 80).

In some embodiments, the resource includes a network address, and an application endpoint representation is stored in the security database 122, and further connected to a representation of a resource on which the application endpoint is detected. In certain embodiments, it is advantageous to perform active inspection utilizing an active inspector 125 to determine if the application endpoint is a validated application endpoint which can be utilized to access the resource from a network which is external to the first computing environment 110.

Figure 2A:
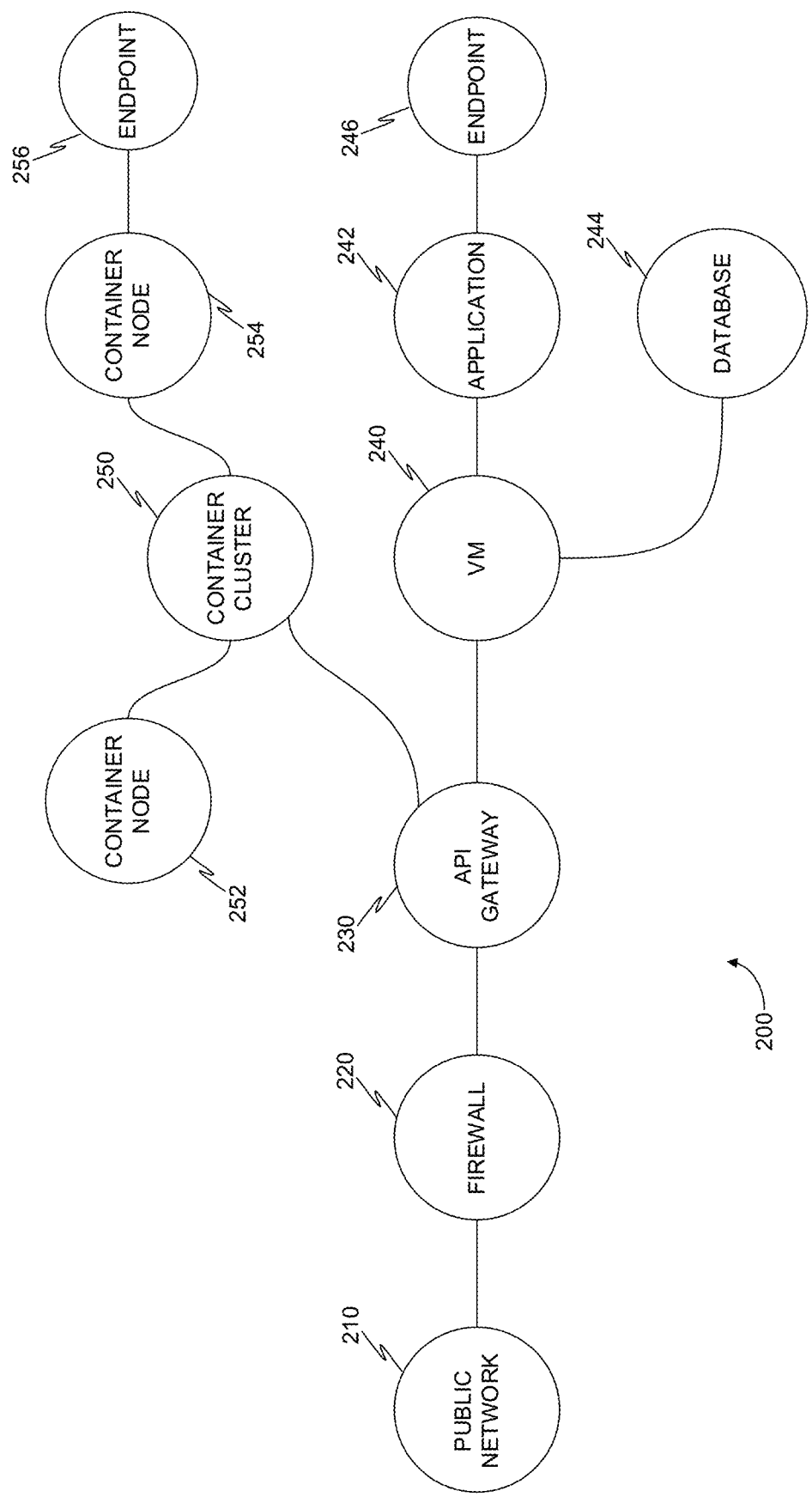
FIG. 2A is an example of a security graph illustrating a network path to an application endpoint, implemented in accordance with an embodiment.

FIG. 2A is an example of a security graph 200 illustrating a network path to an application endpoint, implemented in accordance with an embodiment. The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 210 (also referred to as public network node 210) represents a public network, such as public network 130 of FIG. 1 above. An enrichment node, such as enrichment node 210, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application and a database, and the API gateway node 230 is also connected to a second principal node 250 (also referred to as container cluster node 250) which hosts a plurality of container nodes.

In an embodiment, the VM node 240 is connected to an application node 242, and a database node 244. The application node 242 may indicate, for example, that a certain application, having a version number, binaries, files, libraries, and the like, is executed on the VM which is represented by the VM node 240. In an embodiment, the application node 242 is connected to an application endpoint node 246, indicating that the application includes an application endpoint, which potentially exposes the VM represented by VM node 240 to an external network.

In an embodiment, the VM node 240 is connected to a plurality of application nodes. According to an embodiment, the database node 244 represents a database which is stored on the VM (represented by VM node 240), or stored on a storage accessible by the VM. The database node 244 may include attributes which define a database, such as type (graph, columnar, distributed, etc.), version number, query language, access policy, and the like, in an embodiment.

In some embodiments, the container cluster includes a plurality of container nodes, which are represented for example by first container node 252 and second container node 254. In an embodiment, the second container node 254 includes an application endpoint, represented by an application endpoint node 256.

FIG. 2B is an example illustration of a graphical user interface (GUI) of a representation of an application endpoint, utilized to describe an embodiment. In an embodiment, a representation of an application endpoint includes a plurality of properties 260. For example, in some embodiments, the properties 260 are data fields which have data values populated by performing static analysis, inspection, active inspection, and the like.

In an embodiment, the properties 260 of an application endpoint representation include a name, a host, a port, a cloud platform, a protocol, a combination thereof, and the like.

In certain embodiments, the representation includes a severity 270 indicating a level of severity of the application endpoint to the cybersecurity of the computing environment. In an embodiment, the severity is stored as a data value including a quantitative score (e.g., '1' through '10'), a qualitative score (e.g., 'low', 'medium', 'high', etc.), a combination thereof, and the like.

In an embodiment, the representation further includes a status of a port, a status of a network protocol message (e.g., an HTTP status), an authentication service provider, an authentication method, a status code (e.g., '403', which is an HTTP status code), a browser output (e.g., a screenshot), a combination thereof, and the like.

Figure 3:
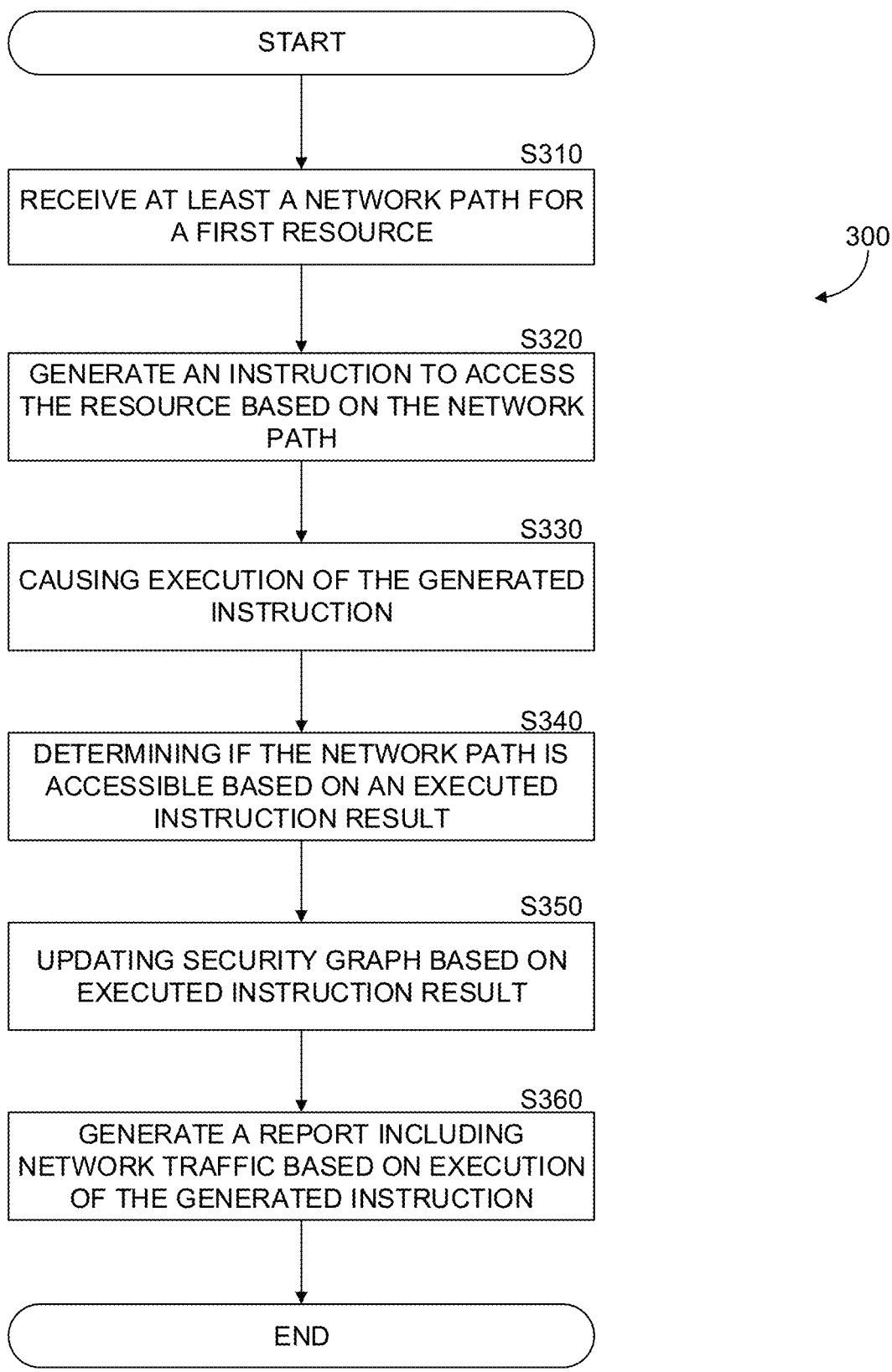
FIG. 3 is an example flowchart of a method for performing active inspection of a cloud computing environment, implemented in accordance with an embodiment.

FIG. 3 is an example flowchart 300 of a method for performing active inspection of a cloud computing environment, implemented in accordance with an embodiment.

At S310, at least one network path for a first resource in a cloud computing environment is received. The network path, also known as object reachability, includes data (e.g., reachability parameters) for accessing the first resource from a public network, which is not the cloud computing environment of the first resource, such as the Internet. In an embodiment, an active inspector may receive the at least a network path, for example from a security graph. In an embodiment, S320 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 4A and 4B below.

At S320, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET/bin HTTP/1.1
Host: 10.0.0.127:800 and further generate another HTTP GET request:

GET/bin HTTP/1.1
Host: 10.0.0.127:801 and so on, which when executed attempt to access a/bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S330, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S340, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S350, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S360, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 122 may be updated based on the determined viability of the network paths. For example, if a resource is successfully accessed, or successfully unaccessed (i.e., an attempt was made to access the resource and the attempt was not successful in accessing the resource), this result can be stored as an attribute of a node representing the resource in the security graph. For example, the VM node 240 of FIG. 2 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

Figure 5:
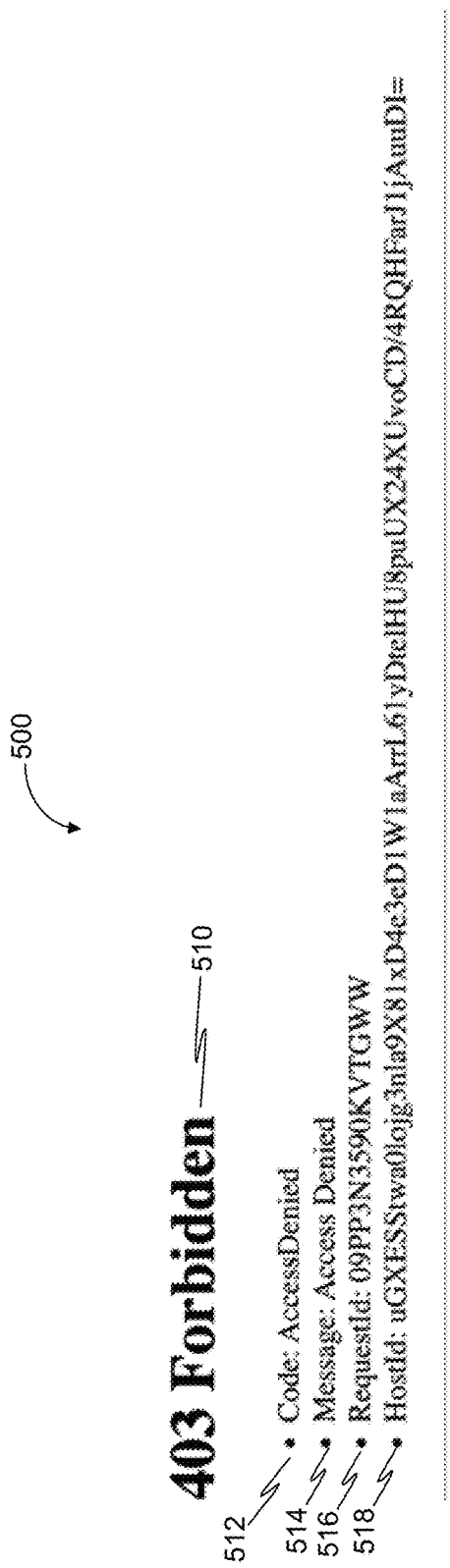
FIG. 5 below is one such example of a screenshot of a user interface, implemented in accordance with an embodiment.

In certain embodiments the active inspector may generate a screenshot of a user interface used to access the resource through the network path. FIG. 5 below is one such example of a screenshot of a user interface, implemented in accordance with an embodiment.

Furthermore, utilizing the active inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

Figure 4A:
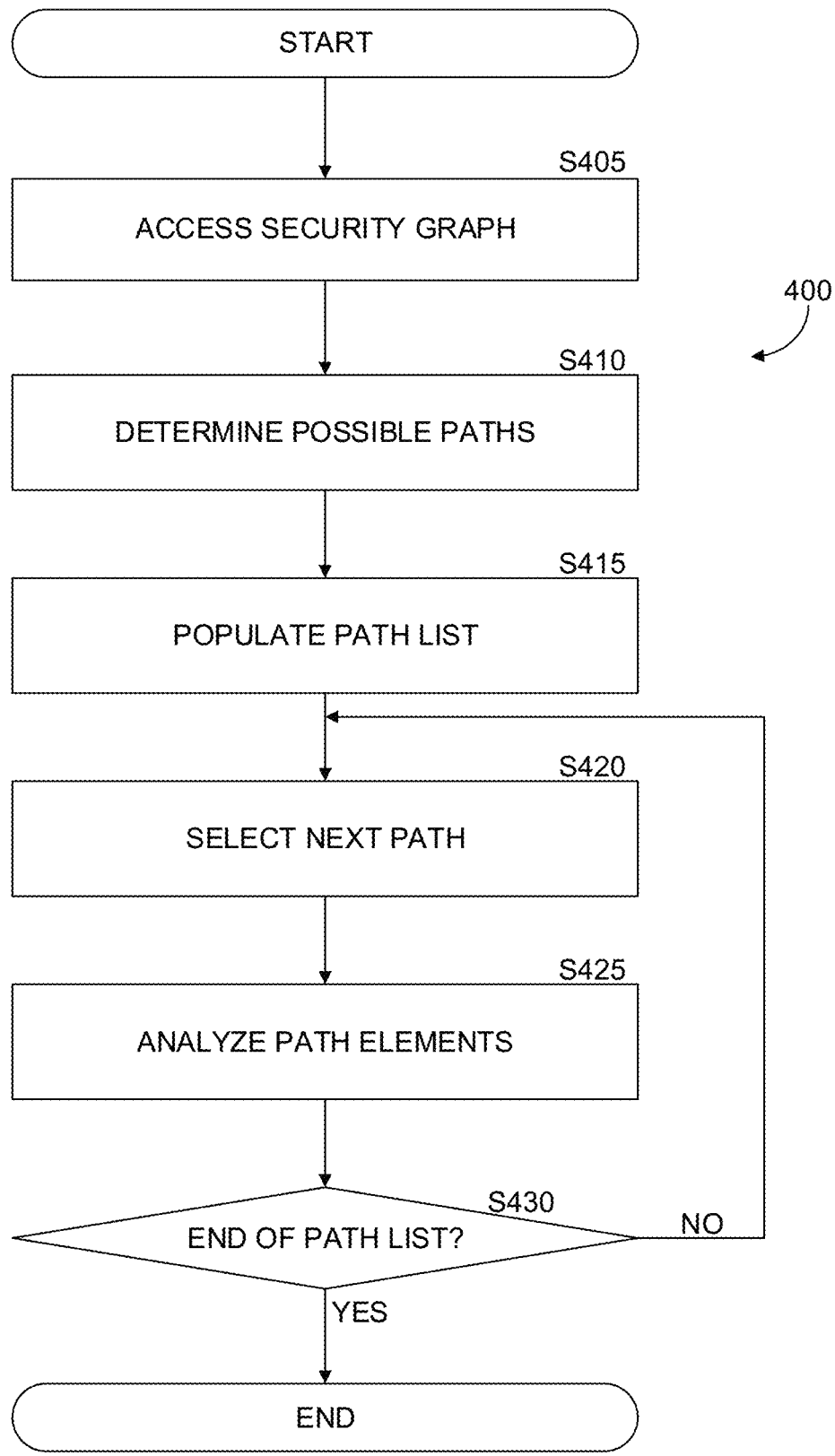
FIG. 4A is an example flowchart depicting a method for determining reachable properties of security objects, according to an embodiment.

FIG. 4A is an example flowchart 400 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S405, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S410, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S410 through S430, the list of paths are iteratively identified to determine the reachability properties of the path. Specifically, at S415, a path list is populated to include all identified paths. A path list may be a table, list, or other type of data structure. A path list may be unordered or ordered, including ordering according to one or more path properties.

At S420, a path from the path list is selected. At a first run of the method a first path in the list is selected.

At S425, path elements are analyzed to determine reachable properties. Path element analysis, as at S425, is an iterative analysis of each element included in the path selected at S420. The operation of S425 is discussed in detail with reference to FIG. 4B.

At S430, it is determined whether the last path of the path list has been analyzed, and if so, execution terminates; otherwise, execution returns to S420.

Figure 4B:
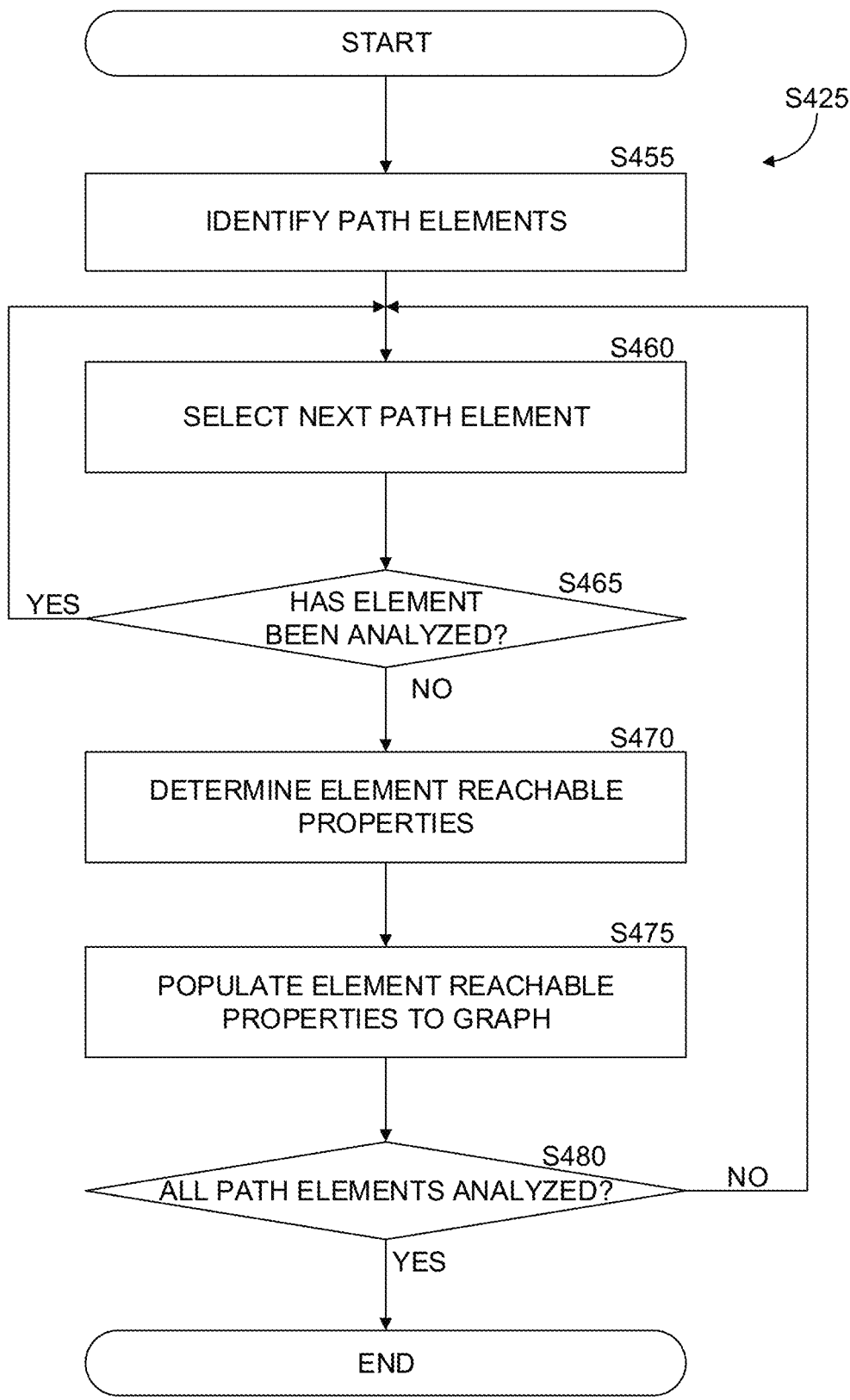
FIG. 4B is an example flowchart depicting the analysis of a network path to determine reachable properties of objects included in the path, according to an embodiment.

FIG. 4B is an example flowchart S425 depicting the analysis of a network path to determine reachable properties of objects included in the path, according to an embodiment.

At S455, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S410 of FIG. 4A, above, and the like, as well as any combination thereof. Further, identification of in-path elements may include identification of element properties or attributes including, without limitation, names, network addresses, rulesets, port configurations, and the like, as well as any combination thereof.

Then, at S460 through S480, the list of paths are iteratively processed in order to determine reachable properties of the elements. Specifically, at S460, the next element is selected. The next element is a subsequent element of the set of elements, within the selected path, identified at S455. Where execution of S460 follows the execution of S480, the next element may be an element which, in the selected network path, immediately follows the element relevant to the preceding execution of S470 and S475. Where execution of the method described with respect to FIG. 4B includes a first execution of S460, the first execution of S460 may include the selection of a first element of the selected path.

For exemplary purposes, a network path may be a path from a virtual machine (VM), connected to a NIC, connected to a load balancer, connected to a firewall. According to a first example, where S460 is executed for the first time, the first execution of S460 may include the selection of the VM as the selected element. Further, according to a second example, where execution of S460 follows execution of S480, selection of a next element at S460 may include selection of, following the VM, selection of the NIC, or, following the NIC, selection of the load balancer, or, following the load balancer, selection of the firewall.

At S465, it is determined whether the selected element has been analyzed.

Determination of whether the selected element may include the determination of whether one or more reachable properties are included in the relevant graph element. As execution of S475 provides for the population of reachable properties into the security graph, an element which does not include such reachable properties in the graph may be assumed to have not been analyzed.

Where, at S465, it is determined that the selected element has been analyzed, execution continues with S460. Where, at S465, it is determined that the selected element has not been analyzed, execution continues with S470.

At S470, reachable properties are determined. Reachable properties are object properties describing if, and how, a given path element is reachable through the selected path, and, specifically, from an external network, an internal network, both, and a combination thereof. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

At S475, reachable properties are populated into the security graph. Reachable properties, as may be determined at S470, may be populated into the graph by processes including, without limitation, labeling or tagging graph vertices (or "nodes"), updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S480, it is determined whether all elements in the selected path have been analyzed. Determination of whether all elements in the selected path have been analyzed may include, without limitation, determination of whether the immediately preceding execution of S475 relates to the last element in the selected path, determination of whether additional elements remain in the path, determination of whether any additional in-path elements have been analyzed, and the like, as well as any combination thereof.

Where, at S480, it is determined that all elements in the selected path have not been analyzed, execution continues with S460. Where, at S480, it is determined that all elements in the selected path have been analyzed, execution terminates.

FIG. 5 is an example of a screenshot 500 generated by an active inspector, implemented in accordance with an embodiment. A screenshot is an image which shows the contents of a computer display. In an embodiment, an active inspector, such as the active inspector 125 of FIG. 1, may include a web browser application for executing access instructions. The web browser application may generate a user interface intended for a display. The screenshot 500 includes a portion of such a user interface, which includes a response header 510 received based on a request to access a resource. In this case the response header 510 includes an HTTP code 403 (i.e., forbidden), meaning that the request to access the resource was denied. A detailed code 512 includes a message which is associated with the 403 code (i.e., "access denied"), a message 514, a request identifier 516, and a host identifier 518.

Figure 6:
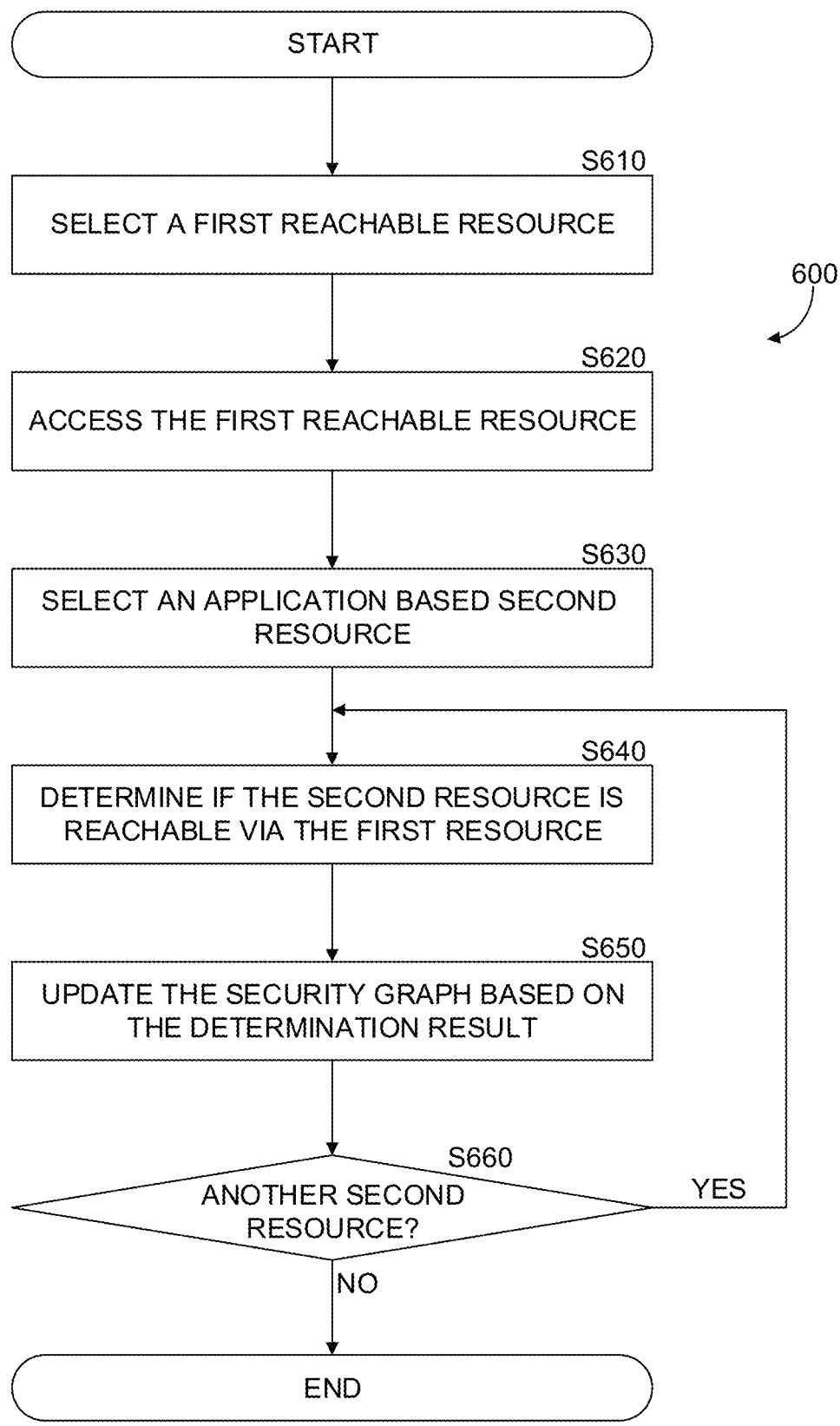
FIG. 6 is an example flowchart of a method for detecting application paths, according to an embodiment.

FIG. 6 is an example flowchart 600 of a method for detecting application paths, according to an embodiment. An application path is a path an attacker may use when gaining access to a cloud computing environment, which includes a first resource through which the attacker gains access to the cloud computing environments, and subsequent second resources which the attacker is able to access in the cloud computing environment, after gaining access to the first resource, wherein the first resource corresponds to a virtual machine, container, and the like, and the second resource corresponds to an application executed (or deployed) on the first resource. In an embodiment, detecting an application path includes detecting a vulnerability which allows to reach a first resource, gain access to it, and through the first resource gain access to a second resource which is accessible to the first resource, but should not be accessible, for example, to the user account or service account accessing the first resource.

At S610, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S620, the first resource is accessed. In an embodiment, accessing the first resource includes providing the first resource with credentials which allow access to the first resource. For example, a private key may allow accessing an SSH server. As another example, an API gateway, such as the API gateway 230 of FIG. 2A may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server.

At S630, a second resource is selected. In an embodiment, the second resource is an application exposed through the first resource. In an embodiment a security graph is queried to determine the second resource. In some embodiments, the cloud computing environment in which the first resource is deployed is represented in the security graph, for example as detailed in FIG. 2A above. In some embodiments, querying the security graph includes causing a query to be executed on a database hosting the security graph, and receiving as a result an identifier of a node which represents a second resource which is connected to the node representing the first resource.

For example, a security graph may be traversed to detect a node representing an application (application node) which is connected to the node representing the first resource. A second network path may be determined, to the application node from the first resource node. For example, the first resource may be accessed by accessing "example.com:80", while the second resource (i.e., application node) is accessed by using an application address, or other listening address. In an embodiment, an application may be predetermined to be listening on an address, port, and the like. The second network path may be generated based on the predetermined listening.

As another example, the application node may indicate that a web server application (second resource) is deployed on a virtual machine (first resource). An access attempt may include generating an access instruction on the first resource (first network path) using port 80 (second network path), which is a predetermined port used for Internet web traffic.

At S640, the second resource is actively determined to be reachable via the first resource. In an embodiment, a second resource is reachable from the first resource, if the first resource can be used to access the second resource. In the example above, if the web server is reachable through the virtual machine, then the web server is reachable. Thus, if the first resource is a reachable resource, meaning that a network path is found which is viable, and the second resource is accessible from the first resource, then an attacker which gains access to the first resource may also gain access to the second resource. Thus, while the second resource may not have a direct viable network path, it can still become reachable by accessing the first resource, meaning that there is a second network path, which is the network path between the first resource and the second resource. In an embodiment, a resource is accessible if, for example, it can be sent instructions which are then executed by the resource. For example, a SQL database may be determined to be reachable if a network path is determined to a virtual machine hosting the SQL database application, and a second network path allows access to the SQL database (i.e., application path), and further an instruction for performing an SQL injection is generated for execution by the SQL database application.

At optional S650, a security graph is updated based on the determination. In some embodiments, a node may include an indicator to indicate if a resource is reachable. In other embodiments, an edge may be added between a node representing the first resource and a node representing the second resource, to indicate that the second resource is reachable from the first resource. Actively inspecting second resources in this manner allows to detect certain vulnerabilities in a cloud computing environment, which is of course desirable.

At S660, a check is performed to determine if another second resource should be checked for reachability from the first resource. In an embodiment execution continues at S640 if another resource should be checked to determine reachability, otherwise execution terminates. For example, if another application is determined to be deployed on the first resource, e.g., by traversing a security graph and detecting another application node connected to the first resource node, a second application path may be determined and reachability thereto may be determined by performing the method detailed herein.

Figure 7:
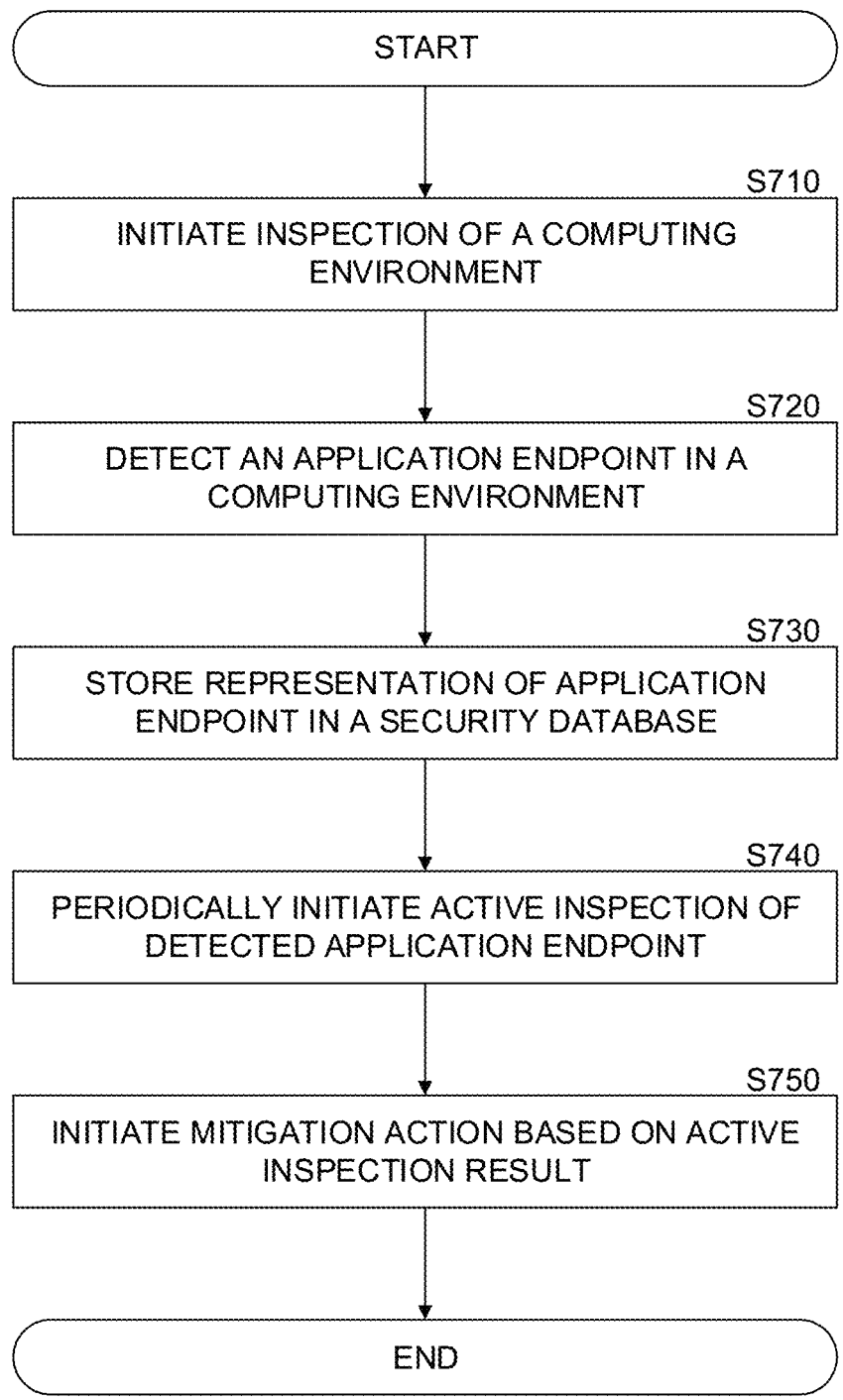
FIG. 7 is an example flowchart of a method for cybersecurity inspection of application endpoints of a computing environment, implemented in accordance with an embodiment.

FIG. 7 is an example flowchart of a method for cybersecurity inspection of application endpoints of a computing environment, implemented in accordance with an embodiment. In an embodiment, an application endpoint is detected for a resource deployed in a computing environment, such as a cloud computing environment. It is advantageous, according to some embodiments, to validate continuously, periodically, and the like, accessibility through an application endpoint, for example utilizing an active inspector configured to perform such a method.

At S710, a computing environment is inspected. In an embodiment, a computing environment is inspected for cybersecurity objects which, for example, indicate a cybersecurity threat, a cybersecurity risk, a misconfiguration, a vulnerability, an exposure, a combination thereof, and the like.

In an embodiment, the computing environment is inspected to detect network paths. For example, in some embodiments, an inspector is configured to perform network discovery of a network of a computing environment to detect network objects. In certain embodiments, resources of the computing environment are inspected, for example utilizing static analysis techniques, to detect a software application, a software library, a software binary, and the like.

In an embodiment, inspecting a computing environment includes configuring a resource of the computing environment to install thereon a sensor. In an embodiment, a sensor is configured to detect runtime data, a runtime process identifier, software artifacts, a combination thereof, and the like.

At S720, an application endpoint is detected. In an embodiment, an application endpoint is detected on a resource utilizing the inspection techniques discussed in more detail herein. In certain embodiments, inspecting a computing environment includes detecting a plurality of application endpoints respective of a single resource. For example, in an embodiment, a resource has a plurality of application endpoints, including a first application endpoint having a first network address utilizing a first port, and a second application endpoint having the first network address utilizing a second port.

In an embodiment, an application endpoint is detected based on an application detected, for example by static analysis, on a resource. For example, in an embodiment, a PostgreSQL™ software application is detected on a virtual machine having an address 195.24.12.2 in a cloud computing environment. In an embodiment, Postgres is configured to utilize port 5432, and an application endpoint is therefore detected at 195.24.12.2:5432.

At S730, a representation is stored in a security database. In an embodiment, the security database includes a representation of the computing environment. In some embodiments, the security database includes a representation of the resource on which the application endpoint was detected.

In some embodiments, an endpoint representation includes an identifier, a hostname, a port number, a computing environment identifier, a computing environment type, an external IP address, an internal IP address, a status indicator, a protocol identifier, a browser result, a browser screenshot, an authentication method, a severity indicator, a combination thereof, and the like.

In certain embodiments, a representation of an endpoint is connected via a vertex to a representation of a resource on which the endpoint is detected. In some embodiments, the representation of the resource is connected to multiple representations, each representing a unique endpoint detected on the resource.

At S740, active inspection is initiated. In an embodiment, active inspection is initiated for an application endpoint. In some embodiments, active inspection is initiated for an application endpoint periodically, e.g., every day for a number of days, every hour for a number of hours, etc.

In certain embodiments, active inspection includes initiating an instruction to connect to the application endpoint, for example through a port, a suspected port, etc. According to an embodiment, a TCP three-way handshake is initiated from an external network to the resource utilizing the application endpoint, and a result is recorded, stored, etc.

In an embodiment, a TCP three-way handshake includes a SYN message (utilized by the active inspector to initiate a connection), a SYN-ACK message (utilized by the resource to acknowledge and synchronize the connection) and an ACK message (utilized by either the resource or the active inspector to confirm receipt of the SYN message).

In some embodiments, based on a response received from the resource, a status, status indicator, and the like, is established for the application endpoint. For example, in an embodiment, the status is respective of the port, such as open (a port is open on the resource), closed (all ports are closed), inspector disabled (active inspection is not permitted to this resource), excluded (the resource is excluded from inspection), unsupported port (a port is not supported by the inspector), inspection failed, a combination thereof, and the like.

In an embodiment, an active inspector is further configured to initiate a network protocol inspection on an open port. For example, in some embodiments, the network protocol is HTTP, and the active inspector is configured to send an HTTP GET request to the resource. In an embodiment, a response to the GET request is stored, recorded, etc., in the application endpoint representation. An example of this is discussed in more detail with respect to FIG. 5 above.

In an embodiment, a protocol is utilized over a port based on the port number. In some embodiments, the protocol is, for example HTTP, HTTPS, FTP, SSH, SMTP, SMB, IPSec, SFTP, MSSQL, Grafana, MySQL, RDP, UPnP, PostgreSQL, Redis, Kubernetes API, Cassandra, SSL, Elasticsearch, and the like.

In some embodiments, where an application is detected through active inspection, a representation is generated to indicate that an application (e.g., a hosted technology) was validated in runtime.

At S750, a mitigation action is initiated. In an embodiment, the mitigation action is initiated based on a result of the active inspection. In some embodiments, a result of the active inspection is matched to a policy, a rule, conditional rule, and the like. This is advantageous as it provides a mechanism for initiating a mitigation action based on pre-determined objective criteria which are applied in a consistent manner.

For example, in an embodiment, a policy includes a rule stating that no resource should have an open port. In such an embodiment, where an open port is detected (and in some embodiments further validated) through active inspection, a mitigation action further includes generating a remediation action, an alert, etc.

In some embodiments, a plurality of policies are implemented on a computing environment by applying the policy on a representation of the computing environment stored in the security database. In an embodiment, a security database is configured with a plurality of predetermined policies, for example each policy having a different level of leniency, and further configured to accept an input indicating which policy to apply to the computing environment.

In certain embodiments, the policy further includes an exception, including an identifier of a resource, a resource type, a group type, and the like, on which the policy should not be applied.

In an embodiment, a remediation action is initiated. In some embodiments, a remediation action includes generating an alert, generating a severity of an alert, updating a severity of an alert, generating a ticket in a support ticket system, updating a severity of a generated ticket, sandboxing a resource, revoking access from a resource, revoking access to a resource, configuring a resource to open a port, configuring a resource to close a port, configuring a resource to temporarily close a port, a combination thereof, and the like.

Figure 8:
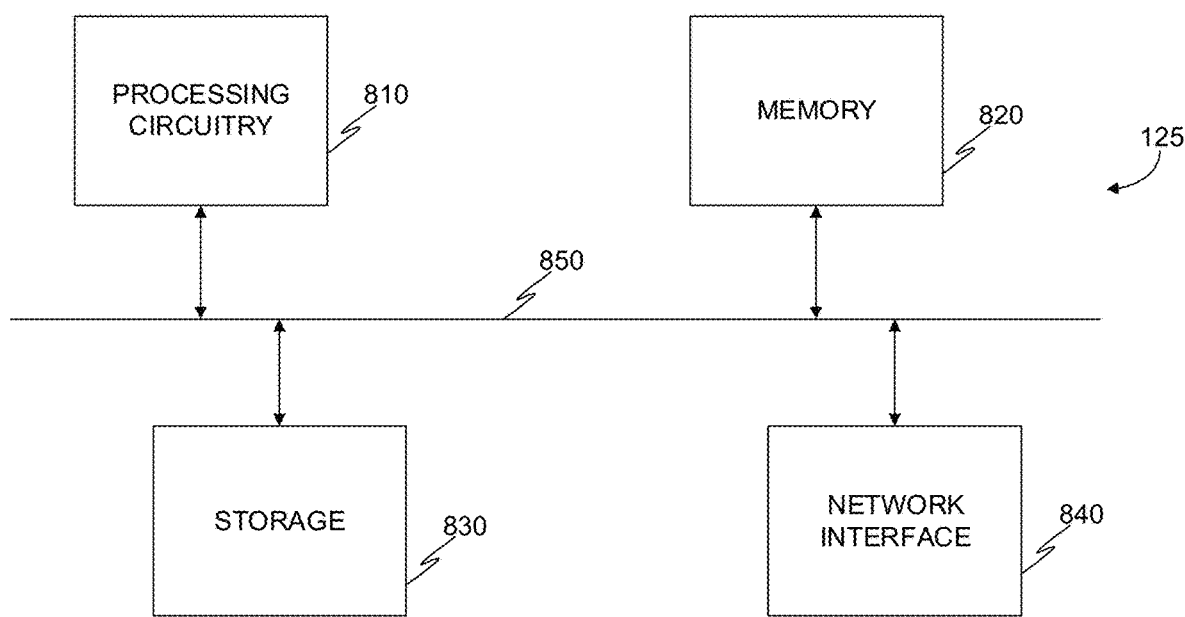
FIG. 8 is an example schematic diagram of an active inspector according to an embodiment.

FIG. 8 is an example schematic diagram of an active inspector 125 according to an embodiment. The active inspector 125 includes, according to an embodiment, a processing circuitry 810 coupled to a memory 820, a storage 830, and a network interface 840. In an embodiment, the components of the active inspector 125 are communicatively connected via a bus 850.

In certain embodiments, the processing circuitry 810 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 820 is a volatile memory (e.g., random access memory, etc.), a non-volatile memory (e.g., read only memory, flash memory, etc.), a combination thereof, and the like. In some embodiments, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein is stored in the storage 830, in the memory 820, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 810, cause the processing circuitry 810 to perform the various processes described herein, in accordance with an embodiment.

In some embodiments, the storage 830 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 840 is configured to provide the active inspector 125 with communication with, for example, the computing environment 110, the public network 130, the inspection controller 127, the security database 122, and the like, according to an embodiment.

It should be understood that the embodiments described herein are not limited to the specific architecture illustrated in FIG. 8, and other architectures may be equally used without departing from the scope of the disclosed embodiments.

Furthermore, in certain embodiments the inspection controller 127, the security database 122, a combination thereof, and the like, may be implemented with the architecture illustrated in FIG. 8. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for application endpoint validation and securement, comprising:
   detecting an application endpoint on a resource already deployed in a computing environment;
   generating in a security database: a representation of the application endpoint, and a representation of the resource, wherein the security database includes a representation of the computing environment;
   determining the existence of at least one already existing network path between the resource and an external network, the network path including the application endpoint and a reachability parameter;
   initiating active inspection of the application endpoint over the network path; and
   initiating a mitigation action in the computing environment in response to determining through active inspection that the application endpoint is exposed to the external network.

2. The method of claim 1, further comprising:
   applying a policy to the representation of the computing environment, wherein the policy includes a rule applied to a representation of the application endpoint.

3. The method of claim 2, further comprising:
   generating a value in the representation of the application endpoint based on a result of applying the rule to the representation of the application endpoint.

4. The method of claim 2, further comprising:
   initiating the mitigation action further in response to determining that the representation of the application endpoint violates the rule.

5. The method of claim 2, further comprising:
   applying the policy to a portion of the representation of the computing environment.

6. The method of claim 5, further comprising:
   applying the policy to the portion of the representation, wherein each representation in the portion of the representation includes a tag having a predetermined value.

7. The method of claim 2, further comprising:
   selecting the policy from a plurality of policies, each policy corresponding to a different level of severity.

8. The method of claim 2, further comprising:
   inspecting the resource for a cybersecurity object, in response to determining that the representation of the application endpoint violates the rule.

9. The method of claim 8, further comprising:
   determining that the resource includes a cybersecurity risk, based on detecting the cybersecurity object.

10. A non-transitory computer-readable medium storing a set of instructions for application endpoint validation and securement, the set of instructions comprising:
    one or more instructions that, when executed by one or more processors of a device, cause the device to:
    detect an application endpoint on a resource already deployed in a computing environment;
    generate in a security database: a representation of the application endpoint, and a representation of the resource, wherein the security database includes a representation of the computing environment;
    determine the existence of at least one already existing network path between the resource and an external network, the network path including the application endpoint and a reachability parameter;
    initiate active inspection of the application endpoint over the network path; and
    initiate a mitigation action in the computing environment in response to determining through active inspection that the application endpoint is exposed to the external network.

11. A system for application endpoint validation and securement comprising:
    a processing circuitry;
    a memory, the memory containing instructions that, when executed by the processing circuitry, configure the system to:

detect an application endpoint on a resource already deployed in a computing environment;

generate in a security database: a representation of the application endpoint, and a representation of the resource, wherein the security database includes a representation of the computing environment;

determine the existence of at least one already existing network path between the resource and an external network, the network path including the application endpoint and a reachability parameter;

initiate active inspection of the application endpoint over the network path; and initiate a mitigation action in the computing environment in response to determining through active inspection that the application endpoint is exposed to the external network.

12. The system of claim 11, wherein the memory contains further instructions which when executed by the processing circuitry further configure the system to:

apply a policy to the representation of the computing environment, wherein the policy includes a rule applied to a representation of the application endpoint.

13. The system of claim 12, wherein the memory contains further instructions which when executed by the processing circuitry further configure the system to:

generate a value in the representation of the application endpoint based on a result of applying the rule to the representation of the application endpoint.

14. The system of claim 12, wherein the memory contains further instructions which when executed by the processing circuitry further configure the system to:

initiate the mitigation action further in response to determining that the representation of the application endpoint violates the rule.

15. The system of claim 12, wherein the memory contains further instructions which when executed by the processing circuitry further configure the system to:

apply the policy to a portion of the representation of the computing environment.

16. The system of claim 15, wherein the memory contains further instructions which when executed by the processing circuitry further configure the system to:

apply the policy to the portion of the representation, wherein each representation in the portion of the representation includes a tag having a predetermined value.

17. The system of claim 12, wherein the memory contains further instructions which when executed by the processing circuitry further configure the system to:

select the policy from a plurality of policies, each policy corresponding to a different level of severity.

18. The system of claim 12, wherein the memory contains further instructions which when executed by the processing circuitry further configure the system to:

inspect the resource for a cybersecurity object, in response to determining that the representation of the application endpoint violates the rule.

19. The system of claim 18, wherein the memory contains further instructions which when executed by the processing circuitry further configure the system to:

determine that the resource includes a cybersecurity risk, based on detecting the cybersecurity object.

* * * * *